(12) United States Patent
Cho et al.

(10) Patent No.: US 8,826,356 B2
(45) Date of Patent: Sep. 2, 2014

(54) CABLE MODEM AND DATA RECEIVING METHOD THEREOF

(75) Inventors: Yong Seong Cho, Daejeon (KR); Seung Eun Hong, Daejeon (KR); TaeKyoon Kim, Daejeon (KR); O Hyung Kwon, Daejeon (KR); Soo In Lee, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 1407 days.

(21) Appl. No.: 12/181,434

(22) Filed: Jul. 29, 2008

(65) Prior Publication Data

US 2009/0141784 A1 Jun. 4, 2009

(30) Foreign Application Priority Data

Nov. 30, 2007 (KR) .......................... 10-2007-0123889

(51) Int. Cl.
*H04N 7/173* (2011.01)
*H04L 12/42* (2006.01)
(52) U.S. Cl.
USPC .......................................... 725/111; 370/453
(58) Field of Classification Search
CPC ............ H04N 21/60; H04N 21/42676; H04N 21/6118; H04N 21/6168
USPC ......................................................... 370/453
See application file for complete search history.

(56) References Cited

U.S. PATENT DOCUMENTS

| | | | | |
|---|---|---|---|---|
| 6,742,187 | B1 * | 5/2004 | Vogel | 725/126 |
| 2002/0062486 | A1 * | 5/2002 | Park | 725/111 |
| 2002/0144284 | A1 | 10/2002 | Burroughs et al. | |
| 2005/0265398 | A1 | 12/2005 | Chapman et al. | |
| 2007/0140298 | A1 * | 6/2007 | Eng | 370/485 |
| 2008/0273548 | A1 * | 11/2008 | Leano et al. | 370/442 |

FOREIGN PATENT DOCUMENTS

| | | | |
|---|---|---|---|
| KR | 1020010038972 A | | 5/2001 |
| KR | 1020040083325 A | | 10/2004 |
| KR | 10-0738342 B1 | | 7/2007 |

OTHER PUBLICATIONS

Cable Television Laboratories, Inc., "MAC and Upper Layer Protocols Interface Specification", Aug. 3, 2007, Data-Over-Cable Service Interface Specifications DOCSIS 3.0, pp. 38-30, 140-149, 298-304 and 314.*

* cited by examiner

*Primary Examiner* — Nasser Goodarzi
*Assistant Examiner* — Kyu Chae
(74) *Attorney, Agent, or Firm* — Ladas & Parry LLP

(57) ABSTRACT

Disclosed are a cable modem and a data receiving method thereof. The cable modem includes a downlink channel retrieval processing unit to retrieve a downlink channel, receive an entire channel information message through the retrieved downlink channel, and receive a broadcasting supplementary data message when the entire information message is valid; a channel information processing unit to receive broadcasting supplementary data using the broadcasting supplementary data message; an uplink channel retrieval processing unit to retrieve an uplink channel using the entire channel information message; and a channel information managing unit to store and manage main data receiving channels capable of receiving the entire channel information message and the broadcasting supplementary data.

11 Claims, 4 Drawing Sheets

CABLE MODEM AND DATA RECEIVING METHOD THEREOF

CROSS-REFERENCE TO RELATED APPLICATION

This application claims the benefit of Korean Patent Application No. 10-2007-0123889, filed on Nov. 30, 2007, in the Korean Intellectual Property Office, the entire disclosure of which is incorporated herein by reference.

BACKGROUND OF THE INVENTION

1. Field of the Invention

The present invention relates to a cable modem and a data receiving method thereof, and more particular, to a cable modem and a data receiving method which may control duplicate receiving of broadcasting supplementary data, and stably receive the broadcasting supplementary data.

This work was supported by the IT R&D program of MIC/IITA. [2006-S-019-02, Development of Digital Cable Transmission and Receive System for 1 Gbps Downstream]

2. Description of Related Art

Currently, a scheme using a Cable Modem (CM) built in a cable broadcasting receiver, which is defined in an OpenCable standard of a digital cable broadcasting transmission scheme, may be used as a method for transmitting supplementary data related with broadcasting such as Service Information (SI), Conditional Access (CA), and the like. A transmission scheme of the broadcasting supplementary data via the CM may be defined in a Data Over Cable Service Interface Specifications (DOCSIS) Set-Top Gateway. In the DOCSIS Set-Top Gateway, an existing Cable Modem Termination System (CMTS), supplementary requirements for the CM, an interface and protocol between devices are defined. In this instance, the CMTS is used for the purpose of transmission of broadcasting related supplementary data between the CM of a local device and application servers located in a cable broadcasting headend, such as a Service Information Server (SIS), a Conditional Access Server (CAS), and the like.

Currently, along with standardization of DOCSIS 3.0 where a data rate using the CM is supported by a downlink of 160 Mbps and uplink of 120 Mbps, the related technologies have been commercialized. DOCSIS 3.0 may be featured in channel bonding that denotes a technology for bonding a plurality of 6 MHz frequency channels into a signal channel and transmitting the data through the bonded channel. The channel bonding may significantly improve the data rate in comparison with in the existing DOCSIS.

However, a case where a general CM cannot receive DOCSIS Set-top Gateway (DSG) data from a channel, which is selected for the purpose of receiving of the DSG data by the CM, while being normally operated in a full-duplex mode may disadvantageously occur. Also, in the CM supporting the channel bonding, duplicate receiving of the DSG data and unnecessary operations for processing the DSG data may be created. Thus, there is a need for a CM for securely receiving the DSG data and preventing the unnecessary operation from being created.

SUMMARY OF THE INVENTION

An aspect of the present invention provides a cable modem and a data receiving method thereof which may separately manage a channel capable of receiving DOCSIS Set-top Gateway (DSG) data in a cable network supporting channel bonding, and receive the DSG data only through a designated channel, thereby controlling duplicate receiving of identical DSG data, and stably receiving the DSG data.

According to an aspect of the present invention, there is provided a cable modem, the cable modem including: a downlink channel retrieval processing unit to retrieve a downlink channel, receive an entire channel information message through the retrieved downlink channel, and receive a broadcasting supplementary data message when the entire information message is valid; a channel information processing unit to receive broadcasting supplementary data using the broadcasting supplementary data message; an uplink channel retrieval processing unit to retrieve an uplink channel using the entire channel information message; and a channel information managing unit to store and manage main data receiving channels capable of receiving the entire channel information message and the broadcasting supplementary data.

According to an aspect of the present invention, there is provided a data receiving method of a cable modem, the method including: retrieving a main receiving channel of downlink channels; receiving an entire channel information message and broadcasting supplementary data via the main receiving channel; retrieving an uplink channel using the entire channel information message; receiving an assignment of a plurality of downlink channels via communication with a cable modem termination system after obtaining the uplink channel, and composing a channel bonding of the downlink channel; and determining to receive broadcasting supplementary data via a single main data receiving channel of main data receiving channels capable of receiving the entire channel information message and the broadcasting supplementary data.

BRIEF DESCRIPTION OF THE DRAWINGS

The above and other aspects of the present invention will become apparent and more readily appreciated from the following detailed description of certain exemplary embodiments of the invention, taken in conjunction with the accompanying drawings of which.

DETAILED DESCRIPTION OF EXEMPLARY EMBODIMENTS

Figure 1:
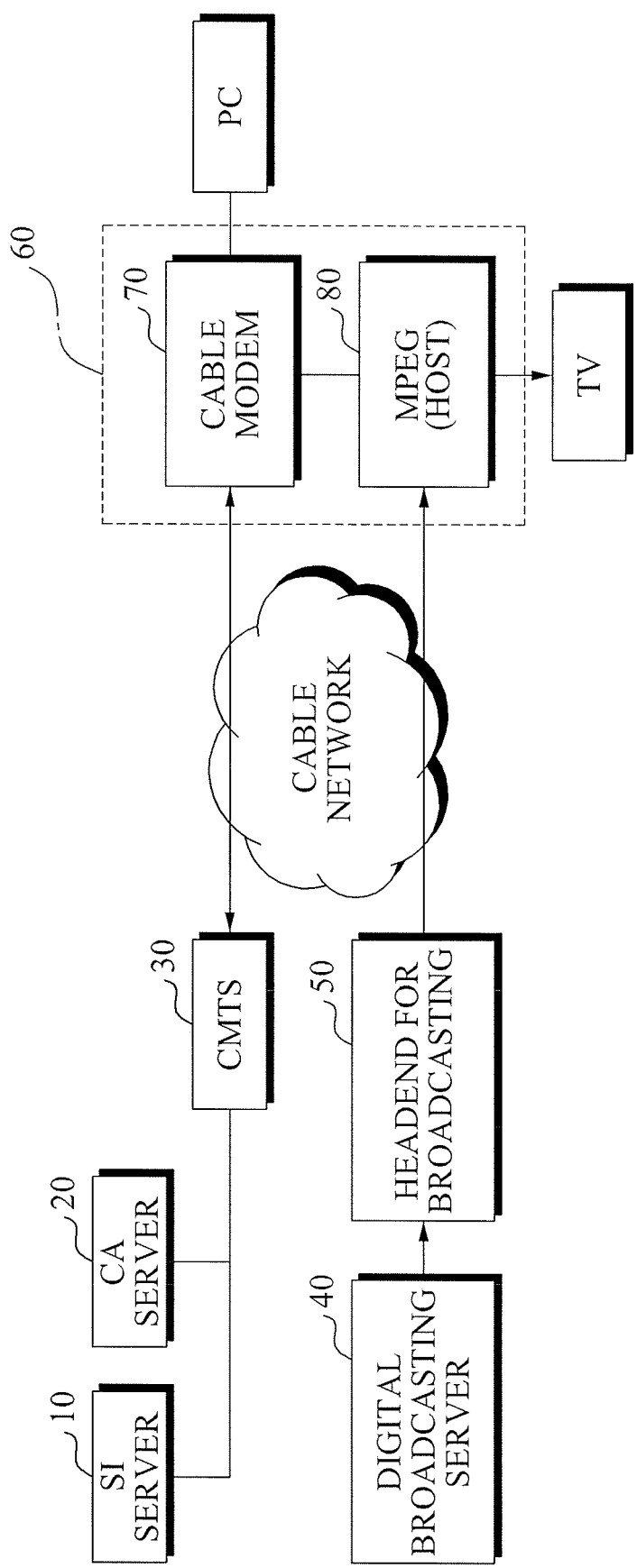
FIG. 1 is a schematic configuration diagram illustrating an OpenCable digital broadcasting system.

Reference will now be made in detail to exemplary embodiments of the present invention, examples of which are illustrated in the accompanying drawings, wherein like reference numerals refer to the like elements throughout. The exemplary embodiments are described below in order to explain the present invention by referring to the figures.

A basic principle of the present invention is featured in that a cable modem (CM) may separately manage a DOCSIS Set-top Gateway (DSG) channel among a plurality of channels, and receive DSG data only via a specific channel, thereby controlling duplicate receiving of identical DSG data, and effectively receiving data. Also, according to the present invention, the CM may store and manage information about the DSG channel in a nonvolatile memory. As a result, when the DSG data cannot be received via a channel, which is selected for the purpose of receiving of the DSG data by the CM, the CM may receive the DSG data via another DSG channel to the nonvolatile memory, thereby increasing security of DSG data reception.

FIG. 1 is a schematic configuration diagram illustrating an OpenCable digital broadcasting system.

A cable digital broadcasting system is constructed such that a local cable broadcasting station and a network unit are connected with each other by a cable network. The local cable broadcasting station may have a Service Information server (SIS) 10 for transmitting broadcasting channel information, a Conditional Access Server (CAS) 20, a Cable Modem Termination System (CMTS) 30, a digital broadcasting server 40, a headend for broadcasting 50, and the like, and the network unit may have a cable digital broadcasting receiver 60 including the CM, a television (TV) receiver 60, and the like.

Data transmitted from the local cable broadcasting station to the network unit may include image and voice signals and supplementary information such as broadcasting program information, and may be transmitted in a packet unit. The cable digital broadcasting receiver 60 receiving the data may process broadcasting signals received from the cable broadcasting station, and convert the processed broadcasting signals into analogue signals capable of being recognized in the TV receiver.

First, devices located in the local cable broadcasting station will be herein described in detail.

Devices related with broadcasting supplementary data may include the SIS 10, the CAS 20, and the CMTS 30, which are connected with one another by an Internet Protocol (IP) network.

The SIS 10 may function to transmit channel information, program map, event information concerning the cable broadcasting to the network unit, and the CAS 20 may function to allow access to a specific service or contents only with respect to an authorized user.

The CMTS 30 acting as a cable modem headend may convert data received from the SIS 10 and the CAS 20 into cable signals, transmit the cable signals to the CM, and covert data uploaded from the cable modem 70 into Internet data signals.

Also, as examples of devices related with the broadcasting signals, the digital broadcasting server 40 and the headend 50 for broadcasting may be given.

The digital broadcasting server 40 may compress and digitize Moving Picture Experts Group (MPEG) audio/video signals, and transmit the digitized signals to an MPEG (Host) 132 of the network unit via the headend 50 for broadcasting.

The headend 50 for broadcasting may refer to a master control center where data is received from the digital broadcasting server 40 via a network to manufacture a program and the manufactured program is transmitted.

The local broadcasting station may have the CMTS 30 and the headend 50 are connected in a network termination. The local broadcasting station communicate with the cable digital broadcasting receiver 60 in house using the CMTS 30 and the headend 50.

In the communication between the CMTS 30 and the network unit, there exist signals flowing from the CMTS 30 to the network unit or inversely. Specifically, a two-way communication is performed between the CMTS 30 and the network unit.

Conversely, in the case of a communication between the headend 50 for broadcasting and the network unit, there exist only signals flowing from the headend 50 for broadcasting to the network unit, resulting in a one-way communication.

The cable digital broadcasting receiver 60 may be required for watching the cable digital broadcasting in house.

The cable digital broadcasting receiver 60 may include the CM 70, an MPEG (Host) 80, and the like.

The CM 70 may be connected with a Personal Computer (PC), thereby enabling use of Internet services via the PC, and also may be used as a return path of a conditional access device included in the cable digital broadcasting receiver 60, thereby being used as a communication path with the CAS. The CM 70 is required to be connected with a coaxial cable of a cable TV company in order to communicate with the CMTS 30 located in each local cable broadcasting station. Here, although not shown, the CMTS 30 and the CM 70 are connected with each other via a plurality of physical channels, and the CMTS 30 may bond the plurality of physical channels into a single channel, and transmit data via the single channel. The CM 70 may receive data transmitted in a state of being divided, and restore the received data to the original data. Also, in the case of an upstream channel, data transmission is performed in the same manner as the above. The above transmission scheme using channel bonding may have a relatively high data rate than that in a scheme for transmitting data to each channel without performing channel bonding. However, a CM for transmitting data to each channel without performing channel bonding may share the same channel.

The MPEG (Host) 80 may decompress received compression MPEG data to thereby covert the decompressed data into broadcasting signals, and transmit the broadcasting signals to the TV.

Figure 2:
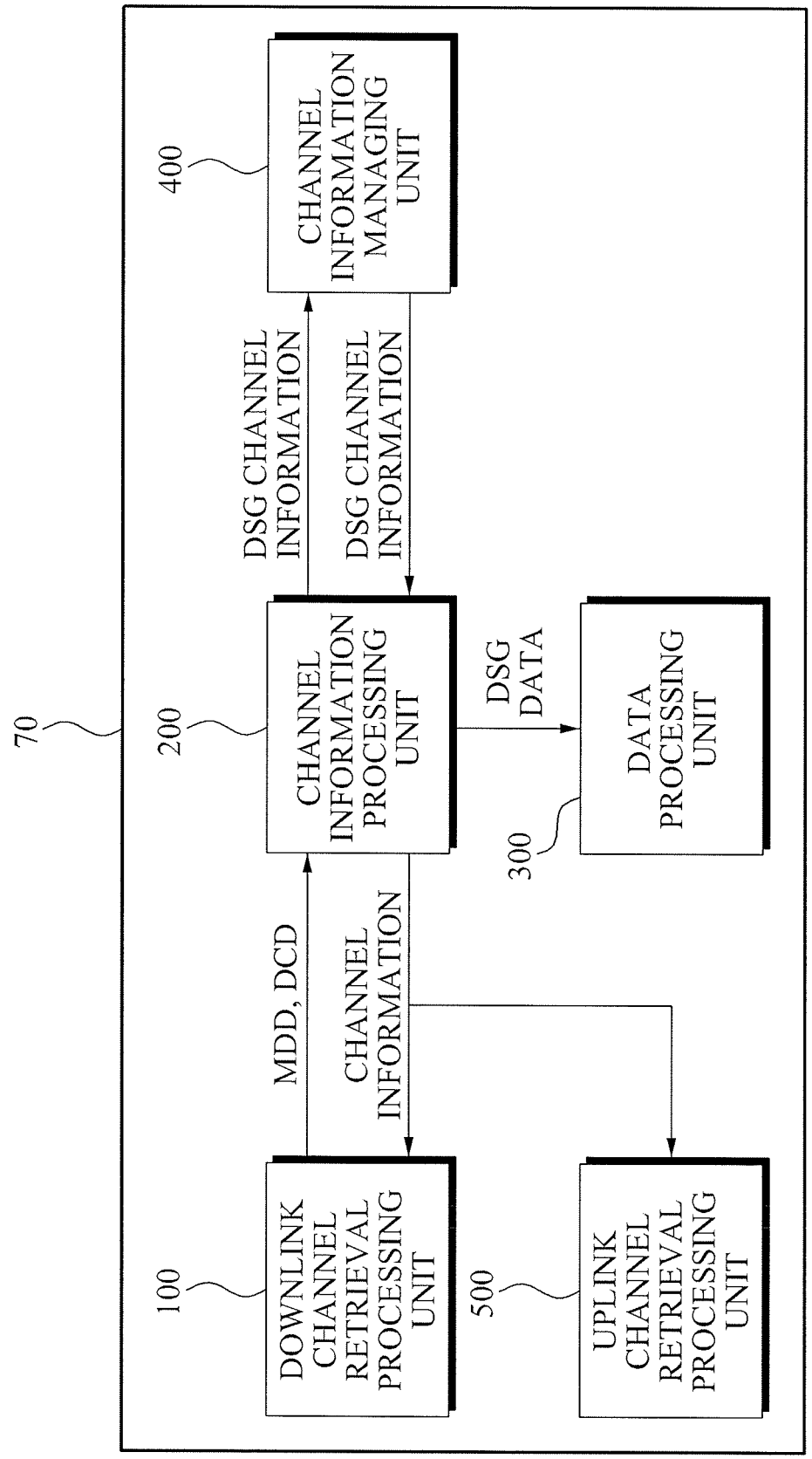
FIG. 2 is a schematic configuration diagram illustrating a Cable Modem (CM) according to an exemplary embodiment of the invention.

FIG. 2 is a schematic configuration diagram illustrating a Cable Modem (CM) according to an exemplary embodiment of the invention.

Referring to FIG. 2, the CM 70 includes a downlink channel retrieval processing unit 100, a channel information processing unit 200, a data processing unit 300, a channel information managing unit 400, and an uplink channel retrieval processing unit 500.

The downlink channel retrieval processing unit 100 may read, from the channel information managing unit 400 via the channel information processing unit 200, channel frequency information of a channel previously acquired when a power is applied, and retrieve a channel. When the channel frequency information of the previous channel is absent, the downlink channel retrieval processing unit 100 may select a channel frequency in accordance with a predetermined method, and retrieve a channel. Specifically, the CM may first select a single channel so as to complete an initial operation. In this regard, when another channel completing the initial operation in advance is present, channel frequency information about the other channel is stored. Thus, the downlink channel retrieval processing unit 100 may first retrieve channel frequency information of the channel completing the initial operation in advance when scanning channels, and may re-retrieve a channel when available resources of the channel completing the initial operation are absent. When the channel is retrieved, channels being synchronized by tuning an entire section of a channel frequency used by the CM for each 60 MHz interval may be selected.

The downlink channel retrieval processing unit 100 may receive a MAC Domain Descriptor (MDD) message from the retrieved channel, and transmit the received message to the channel information processing unit 200. Then, the downlink channel retrieval processing unit 100 may receive, from the channel information processing unit 200, whether the received MDD message is valid data. When the MDD message is the valid data, the channel retrieved by the downlink channel retrieval processing unit 100 results in a main receiving channel, that is, a primary channel, and thus stopping the retrieval. However, when the MDD message is not the valid data, the downlink channel retrieval processing unit 100 may repeatedly retrieve the channel until the primary channel is found. The downlink retrieval processing unit 100 may verify whether a broadcasting supplementary data message, that is, a Downlink Channel Descriptor (DCD) message is transmitted from the retrieved primary channel, and then output the received DCD message to the channel information processing unit 200. Here, the DCD message may include information about a channel capable of receiving the broadcasting supplementary data, more specifically, information about a DOCSIS Set-top Gateway (DSG) data address, data type, and the like so as to filter a DSG data channel.

The channel information processing unit 200 may re-transmit information indicating whether the MDD message received from the downlink channel retrieval processing unit 100 is valid data to the downlink channel retrieval process unit 100. Also, the channel information processing unit 200 may receive the DCD message from the downlink channel retrieval processing unit 100, and also receive the DSG data using the DCD message.

The channel information processing unit 200 may assign a plurality of downlink channels, compose channel bonding, and then store, in the channel information managing unit 400, information about primary DSG feasibility channels, that is, main data receiving channels. Storing the primary DSG feasibility channels in the channel information managing unit 400 is for the purpose of quickly restoring the channel using the information about the primary DSG feasibility channels by managing the primary DSG feasibility channels even when connection with the downlink channel is interrupted. Here, the channel information managing unit 400 may be a nonvolatile memory.

The uplink channel retrieval processing unit 500 may verify that the channel information processing unit 200 receives the DSG data, and then acquire an uplink channel through a communication with the CMTS.

Figure 3:
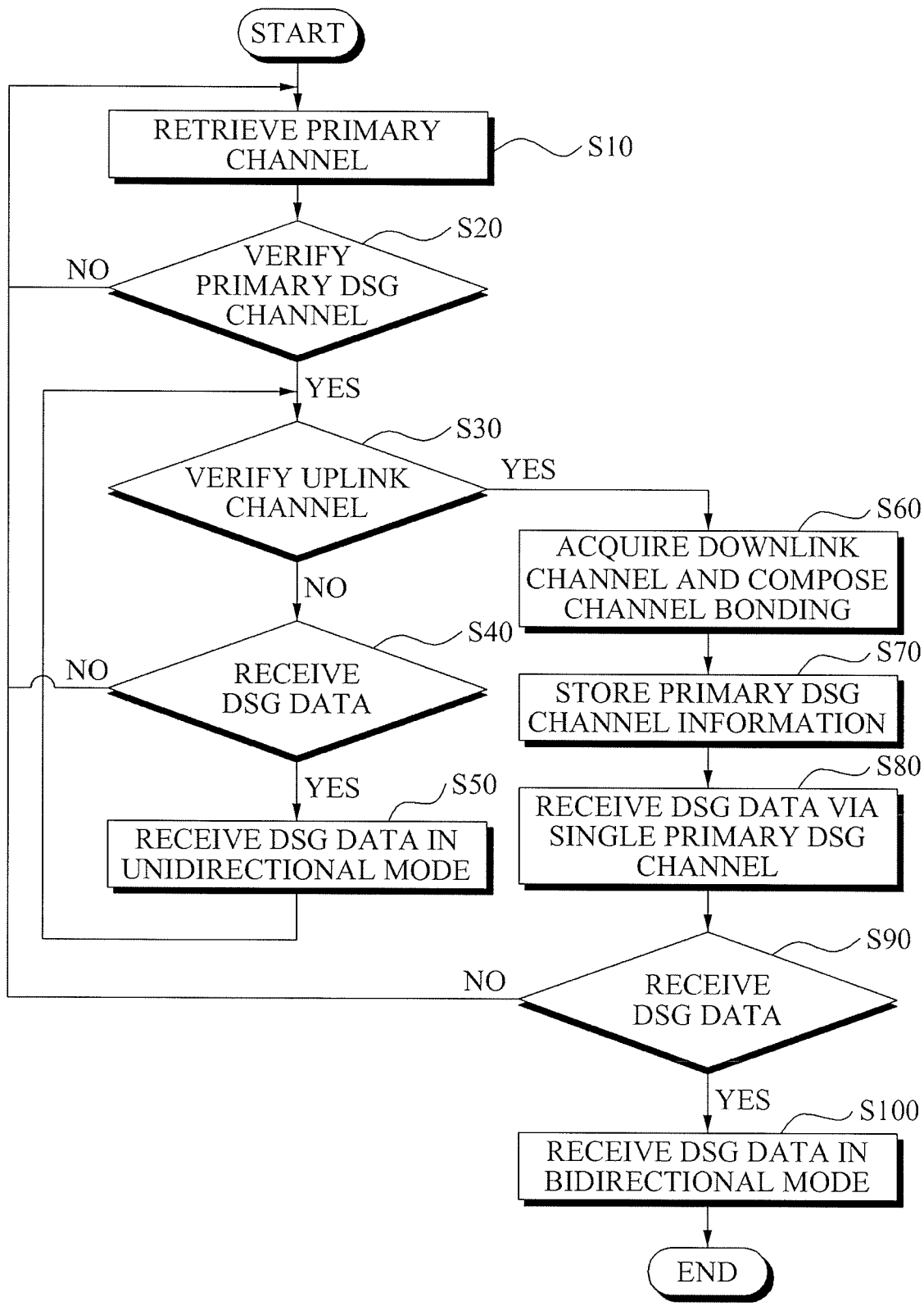
FIG. 3 is an operation flowchart illustrating a CM according to an exemplary embodiment of the invention.

FIG. 3 is an operation flowchart illustrating a CM according to an exemplary embodiment of the invention.

Referring to FIG. 3, in operation S10, a primary channel is retrieved.

The downlink channel retrieval processing unit 100 may read, from the channel information processing unit 200, channel frequency information of the previously acquired channel when an initial power is applied or an initialization of Media Access Control (MAC) is generated, and retrieve a channel. When the channel frequency information of the previous channel is absent, the downlink channel retrieval processing unit 100 may select a channel frequency in accordance with a predetermined method, and retrieve a channel. The downlink channel retrieval processing unit 100 may receive the MDD message from the retrieved channel. Here, the MDD message is a message periodically transmitted from the CMTS to all downlink channels, and may include frequency information about all uplink and downlink channels composing the cable network, information indicating whether the primary channel of each channel is absent, and specific parameter values used for determining characteristics of the channel. The MDD message may be transmitted to the channel information processing unit 200, and thereby validity/invalidity of the MDD message may be verified.

The downlink channel retrieval processing unit 100 may verify that the retrieved channel is the primary channel when the validity of the MDD message is verified by the channel information processing unit 200, and thus stopping the channel retrieval. This is because the valid MDD message is received only through the primary channel. However, when the MDD message is verified to be not valid message, the channel retrieval is required to be re-performed so as to retrieve the primary channel.

Next, in operation S20, a primary DSG channel is verified.

Specifically, the downlink channel retrieval processing unit 100 may verify whether the DCD message is received from a channel where the valid MDD message is received, that is, the primary channel. When the DCD message is received from the primary channel, the corresponding channel is verified to be the primary DSG channel. Specifically, the primary DSG channel may denote a channel via which DSG data is transmitted from among the primary channels. The DCD message may include transmission related parameter information of the DSG data. Then, the channel information processing unit 200 may receive the DCD message from the downlink channel retrieval processing unit 100, and also receive the DSG data using the received DCD message. The received DSG data is transmitted to the data processing unit 300, and processed. The DSG data may be broadcasting supplementary information such as Service Information (SI), Conditional Access (CA), and the like according to a multicast address defined in the DCD message.

Next, in operation S30, an uplink channel is acquired.

Specifically, the uplink channel retrieval processing unit 500 may acquire the uplink channel through a communication with the CMTS in such a manner to retrieve the uplink channel using information about the uplink channel collected from the MDD message to thereby acquire the uplink channel.

When the uplink channel is acquired, ranging and parameter related with the CMTS are adjusted, and an IP address is acquired.

However, in operations S40 and S50, when the uplink channel is not acquired, the DSG data is first received, and the operation for acquiring the uplink channel is repeatedly performed while being performed in a unidirectional mode.

Next, in operation S60, when the uplink channel is acquired, the CM may receive assignment of a plurality of channels through the communication with the CMTS, and compose a downlink channel for channel bonding.

Next, in operation S70, the CM may store, in the nonvolatile memory, the primary DSG feasibility channels from among channels assigned to a bonding channel.

Here, the primary DSG feasibility channels may be channels capable of receiving the MDD and DSG messages after being synchronized by the CM, and act as the primary DSG channel.

Storing the primary DSG feasibility channels in the nonvolatile memory of the channel information managing unit 400 is for the purpose of quickly restoring the channel by managing the primary DSG feasibility channels even when connection with the downlink channel is interrupted.

Next, in operation S80, a single primary DSG channel receiving the DSG data from among the primary DSG feasibility channels is determined.

As described above, determining to receive the DSG data only through the single primary DSG channel is because contents of the DSG data capable of being transmitted via all primary DSG feasibility channels is the same although a plurality of primary DSG feasibility channels from among channels composing the channel bonding may exist, and thus avoiding duplicate receiving of the DSG data.

In this manner, in operations S90 and S100, the CM may receive the DSG data to thereby operate in a DSG full-duplex mode, thereby performing data transmitting/receiving operation via a normal CM.

In general, the CM built in a set-top box may be smoothly operated when channels are connected with each other in the full-duplex mode. However, the CM may be initialized including the operation for re-retrieving the downlink channel when an error may occur or an operation is reset in an abnormal state such as interruption of connection with the uplink channel. In this instance, pay broadcasting may not be watched until completing the initialization. As a method for reducing a time required for restoring the channel, a method for restoring a state while maintaining the downlink channel without re-retrieving the downlink channel in a state where the uplink channel is interrupted may be used. However, in the worst case scenario of the above-described method, the uplink channel may not be restored, and simultaneously the downlink channel is interrupted, and thereby a state where the broadcasting service cannot be received may be maintained.

Conversely, the CM according to the present invention may store and manage the primary DSG feasibility channel information in the nonvolatile memory, so that the CM may quickly restore the channel by retrieving one from among the primary DSG feasibility channels stored in the nonvolatile memory even when not receiving the DSG data to the selected downlink channel.

Figure 4:
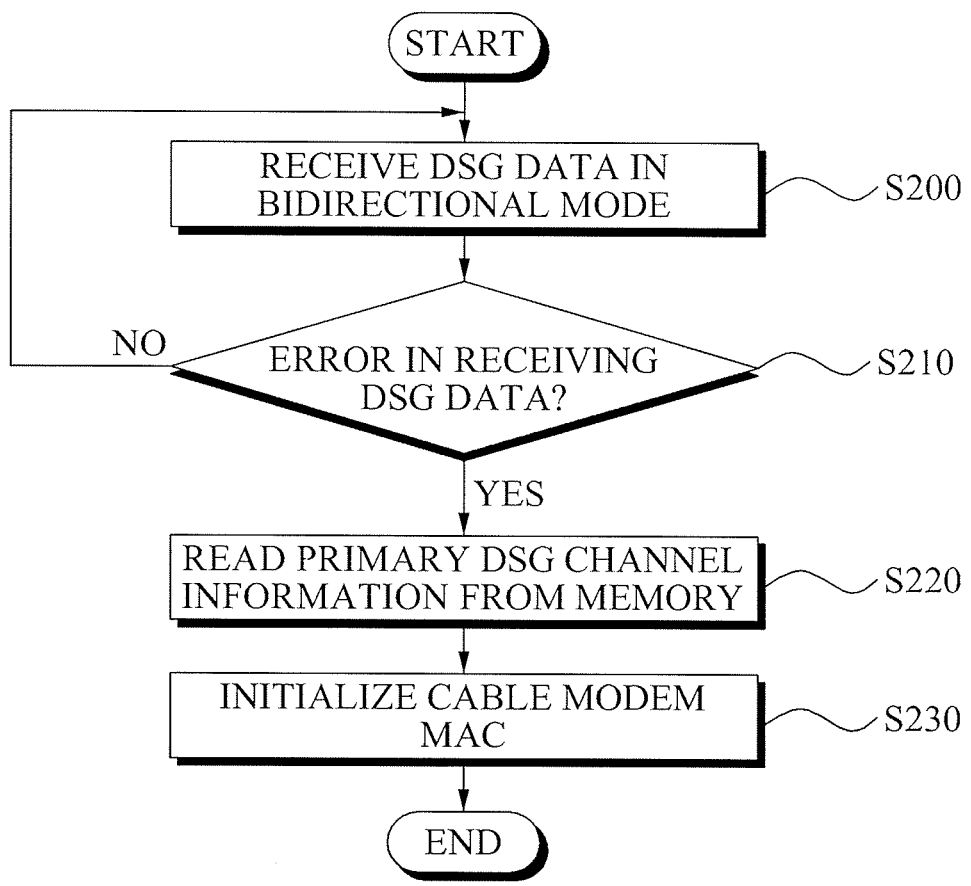
FIG. 4 is a flowchart illustrating a channel recovery method in the case where a data receiving error occurs while a CM according to an exemplary embodiment of the invention is being operated.

FIG. 4 is a flowchart illustrating a channel recovery method in the case where data receiving error occurs while a CM according to an exemplary embodiment of the invention is being operated.

A case where the connection with the channel is interrupted due to various factors while the CM is receiving the DSG data in the DSG full duplex mode, and thus not receiving the DSG data may occur.

Here, in order to restore the channel, in operations S200 and S210, whether receiving of the DSG data is failed in a state of receiving the DSG data in the full-duplex mode may be verified.

Next, in operation S220, the primary DSG feasibility channel information is read from the memory.

When the CM determines that an error in receiving the DSG data occurs, the downlink channel retrieval processing unit 100 may read, from the nonvolatile memory of the channel information managing unit 400, the primary DSG feasibility channel information collected while the preceding normal operation is performed.

Next, in operation S230, an MAC operation of the CM is initialized. When the initialization operation of the MAC is performed, a normal operation is performed in accordance with the described method of FIG. 3, thereby restoring the channel of the CM. Here, the CM may receive, from the nonvolatile memory, the primary DSG feasibility channel information collected while the preceding normal operation is performed, so that a time required for retrieving the primary DSG channel of the downlink channel may be reduced, thereby restoring the channel more quickly and stably.

As described above, according to the present invention, the CM may separately manage the channel capable of receiving the DSG data, and receive the DSG data only through a designated channel in the cable network supporting the channel bonding, thereby controlling duplicate receiving of the same DSG data, and stably receiving the DSG data.

Although a few exemplary embodiments of the present invention have been shown and described, the present invention is not limited to the described exemplary embodiments. Instead, it would be appreciated by those skilled in the art that changes may be made to these exemplary embodiments without departing from the principles and spirit of the invention, the scope of which is defined by the claims and their equivalents.

What is claimed is:

1. A cable modem, comprising:
   a downlink channel retrieval processing unit to read channel frequency information of a previously acquired channel, retrieve a channel from among downlink channels, select a channel frequency when the channel frequency information is absent and retrieving a channel, receive a entire channel information message and broadcasting supplementary data message via the channel, verify validity of the entire channel information message, and verify that the channel is the primary channel when the validity of the entire channel information message is verified;
   a channel information processing unit to receive broadcasting supplementary data using the broadcasting supplementary data message;
   an uplink channel retrieval processing unit to retrieve an uplink channel using the entire channel information message; and
   a channel information managing unit to store and manage a plurality of main data receiving channels each being a downlink channel capable of receiving the entire channel information message and the broadcasting supplementary data.

2. The cable modem of claim 1, wherein the channel information processing unit determines whether the entire channel information message is valid, and transmits the determined result to the downlink channel retrieval processing unit.

3. The cable modem of claim 1, wherein the channel information managing unit is a nonvolatile memory.

4. A data receiving method of a cable modem, the method comprising:
   reading channel frequency information of a previously acquired channel, retrieve a channel from among downlink channels;
   selecting a channel frequency when the channel frequency information is absent and retrieving a channel;
   receiving an entire channel information message and a broadcasting supplementary data message via the channel;
   verifying validity of the entire channel information message;
   verifying that the channel is a main receiving channel when the validity of the entire channel information message is verified;
   retrieving an uplink channel using the entire channel information message;
   receiving an assignment of a plurality of downlink channels via communication with a cable modem termination system after obtaining the uplink channel, and composing a channel bonding of the downlink channel; and
   determining to receive broadcasting supplementary data via a single main data receiving channel of a plurality of main data receiving channels from among channels assigned to a bonded channel, wherein each of the plurality of main data receiving channels is a downlink channel capable of receiving the entire channel information message and the broadcasting supplementary data.

5. The method of claim 4, further comprising:
   storing the main data receiving channels in a nonvolatile memory.

6. The method of claim 4, wherein the retrieving of the uplink channel re-retrieves the uplink channel while receiving the broadcasting supplementary data via the downlink channel and without performing the retrieving of the main receiving channel.

7. The method of claim 5, further comprising:
reading, from the nonvolatile memory, information about the main data receiving channels and initializing the read information.

8. A data receiving method of a cable modem, the method comprising:
reading channel frequency information of a previously acquired channel and retrieving a DOCSIS Set-top Gateway (DSG) channel from among downlink channels;
selecting a channel frequency when the channel frequency information is absent and retrieving a DSG channel;
receiving a MAC Domain Descriptor (MDD) message and a Downlink Channel Descriptor (DCD) message via the DSG channel;
verifying validity of the MDD message;
verifying that the DSG channel is a primary channel when the validity of the MDD message is verified;
retrieving an uplink channel through a communication with a Cable Modem Termination System (CMTS) using information collected from the MDD message;
adjusting ranging and parameter related with the CMTS;
acquiring an IP address;
receiving an assignment of a plurality of downlink channels through communication with a CMTS, and composing a bonded channel by performing channel bonding of downlink channels;
storing primary DSG feasibility channels from among channels assigned to the bonded channel, wherein the DSG feasibility channels are channels capable of receiving the MDD and DCD messages;
determining to receive DSG data from only a single primary DSG channel from among the primary DSG feasibility channels.

9. The data receiving method of claim 8, wherein the DSG feasibility channels are stored in a nonvolatile memory, the method further comprising:
when a data receiving error of a channel of the cable modem occurs while the cable modem is being operated:
reading primary DSG feasibility channel information from the nonvolatile memory in which the DSG feasibility channels are stored;
initializing a MAC operation of the CM using the read primary DSG feasibility channel information to thereby restore the channel of the cable modem.

10. The data receiving method of claim 8, wherein verifying that the DSG channel is a primary channel comprises:
verifying that a retrieved channel is the main receiving channel when the validly of the MDD message is verified;
verify whether the DCD message is received from a channel where the valid MDD message is received; and
when the DCD message is received from the channel where the valid MDD message is received, verifying the channel to be the primary DSG channel.

11. The cable modem of claim 1, wherein the broadcasting supplementary data message is a Downlink Channel Descriptor (DCD) message that includes information about a channel capable of receiving the broadcasting supplementary data.

* * * * *